(12) United States Patent
Shimy

(10) Patent No.: US 9,398,343 B2
(45) Date of Patent: Jul. 19, 2016

(54) METHODS AND SYSTEMS FOR PROVIDING OBJECTS THAT DESCRIBE MEDIA ASSETS

(71) Applicant: United Video Properties, Inc., Santa Clara, CA (US)

(72) Inventor: Camron Shimy, Canyon Country, CA (US)

(73) Assignee: Rovi Guides, Inc., San Carlos, CA (US)

(*) Notice: Subject to any disclaimer, the term of this patent is extended or adjusted under 35 U.S.C. 154(b) by 0 days.

(21) Appl. No.: 14/315,702

(22) Filed: Jun. 26, 2014

(65) Prior Publication Data

US 2015/0382068 A1   Dec. 31, 2015

(51) Int. Cl.

| | |
|---|---|
| *G06F 13/00* | (2006.01) |
| *G06F 3/00* | (2006.01) |
| *H04N 5/445* | (2011.01) |
| *H04N 21/482* | (2011.01) |
| *H04N 21/81* | (2011.01) |
| *H04N 21/4788* | (2011.01) |
| *H04N 21/84* | (2011.01) |
| *H04N 21/442* | (2011.01) |
| *H04N 21/475* | (2011.01) |

(52) U.S. Cl.
CPC ......... *H04N 21/482* (2013.01); *H04N 21/4788* (2013.01); *H04N 21/8146* (2013.01); *H04N 21/84* (2013.01); *H04N 21/44213* (2013.01); *H04N 21/4756* (2013.01); *H04N 21/812* (2013.01)

(58) Field of Classification Search
CPC combination set(s) only.
See application file for complete search history.

(56) References Cited

U.S. PATENT DOCUMENTS

| | | | |
|---|---|---|---|
| 6,239,794 | B1 | 5/2001 | Yuen et al. |
| 6,388,714 | B1 | 5/2002 | Schein et al. |
| 6,564,378 | B1 | 5/2003 | Satterfield et al. |
| 6,756,997 | B1 | 6/2004 | Ward, III et al. |
| 7,165,098 | B1 | 1/2007 | Boyer et al. |
| 7,761,892 | B2 | 7/2010 | Ellis et al. |
| 8,046,801 | B2 | 10/2011 | Ellis et al. |
| 2002/0174430 | A1 | 11/2002 | Ellis et al. |
| 2003/0110499 | A1 | 6/2003 | Knudson et al. |
| 2003/0167471 | A1* | 9/2003 | Roth ............... G06F 3/0481 725/87 |
| 2005/0251827 | A1 | 11/2005 | Ellis et al. |
| 2009/0031357 | A1* | 1/2009 | Ko .................. H04N 5/44543 725/50 |
| 2010/0153885 | A1 | 6/2010 | Yates |
| 2012/0311638 | A1* | 12/2012 | Reyna ............. H04N 21/47 725/52 |

\* cited by examiner

*Primary Examiner* — Mulugeta Mengesha
(74) *Attorney, Agent, or Firm* — Ropes & Gray LLP

(57) ABSTRACT

Methods and systems are described herein for providing objects describing media content. For example, in response to detecting that a particular media listing is not associated with an graphic and/or text content (e.g., box art) describing the particular media listing, a media guidance application may generate a custom graphic and/or text content (e.g., custom box art) for the media listing based on graphic and/or text content of a media listing for a media asset associated with the particular media asset.

18 Claims, 5 Drawing Sheets

METHODS AND SYSTEMS FOR PROVIDING OBJECTS THAT DESCRIBE MEDIA ASSETS

BACKGROUND

In conventional systems, users are presented with a plethora of media content. For example, modern systems allow users to access content such as broadcast television programs, streaming Internet content, On-Demand programs, DVR recordings, etc. Furthermore, modern systems often aggregate much of this content together and present the content in a way that is easily navigable by the user. In some cases, media content is presented to a user through the use of media listings that often include images and/or text content describing the media asset associated with the listing. However, images and/or text content may not be available for all media listings.

SUMMARY

Accordingly, methods and systems are described herein for providing objects describing media content. For example, in response to detecting that a particular media listing is not associated with a graphic and/or text content (e.g., box art) describing the particular media listing, a media guidance application may generate a custom graphic and/or text content (e.g., custom box art) for the media listing. Therefore, if the media guidance application generates for display a listing of media assets that each include graphic and/or text content associated with a respective media asset, the media guidance application may generate for display the custom graphic and/or text content for display with the particular media listing.

The media guidance application may detect various characteristics about a media asset and use those particular characteristics to generate for display custom image or text content for the media listing. For example, the media guidance application may determine whether or not the media asset in need of custom graphic and/or text content is related to another media asset, is part of a particular genre, is associated with particular user preferences, etc. In response to determining the characteristics of a media asset is in need of custom graphic and/or text content, the media guidance application may base the custom graphic and/or text content on these characteristics.

For example, in response to determining that a media asset in need of custom graphic and/or text content is related to another media asset, the media guidance application may determine whether or not the other media asset has graphic and/or text content available. If so, the media guidance application may retrieve that graphic and/or text content for use with the media asset in need of custom graphic and/or text content. For example, the media guidance application may retrieve an image used in the media listing for the other media asset and replace the title with that of the media asset in need of custom graphic and/or text content.

In some aspects, the media guidance application may receive a request for a first media identifier, in which the first media identifier is associated with a first object describing a first media asset. For example, the media guidance application may receive a request (e.g., a search query for media assets meeting user criteria) to generate for display a mosaic listing of available media assets (e.g., meeting the user criteria). For example, the first media identifier may include an area (e.g., a mosaic cell) in which the first object may be included.

The media guidance application may determine that the first object is not available in a database. For example, in response to the request, the media guidance application may query a database listing available objects describing various media assets for an object describing the first media asset. In some embodiments, the object may be graphic and/or text content (e.g., box art) that describes the first media asset.

The media guidance application may determine whether or not the first media asset is part of a series of media assets in response to determining that the first object is not available in the database. For example, in response to determining that the first object is not available, the media guidance application may search for a second object for presentation with the first media identifier. In some embodiments, the media guidance application may determine whether or not the first media asset is associated with (e.g., is part of the same program series as) other media assets in order to determine if objects associated with those other media assets may be associated with the first media asset. For example, the media guidance application may determine whether or not the first media asset is an episode of the series of media assets.

In response to determining that the first media asset is part of the series of media assets, the media guidance application may determine whether or not the database includes a second object, in which the second object is associated with the series of media assets. For example, the media guidance application may determine whether or not an object associated with a series of which the first media asset is included or an object associated with another media asset included in the series (e.g., another episode of the same series as the first media asset) is available.

In response to determining that the database includes the second object, the media guidance application may associate the second object with the first media identifier. For example, in response to determining that there is an available object associated with a series of which the first media asset is included or another media asset included in the series, the media guidance application may retrieve that object for use in the first media identifier.

The media guidance application may then generate for display the first media identifier with the second object. For example, after retrieving an object associated with a media asset that is related to the first media asset, the media guidance application may use that object in a media identifier for the first media asset.

In some embodiments, the media guidance application may customize the second object for use with the first media identifier. For example, the media guidance application may identify textual content in the second object (e.g., a title) and modify the textual content (e.g., replace the title of the second media asset in the second object with the title of the first media asset) based on a characteristic (e.g., the title of the first media asset) of the first media asset.

In some embodiments, the media guidance application may retrieve a default object in response to determining that the first media asset is not part of the series of media assets. For example, if the media guidance application fails to find another media asset that is associated with the first media asset, the media guidance application may retrieve a default object. In some embodiments, the media guidance application may store several default objects and select one of the default objects based on a characteristic (e.g., a genre, user preference, cast information, etc.) of the first media asset. Additionally or alternatively, the media guidance application may select a template (e.g., featuring particular fonts, type size, color palettes, etc.) for the default object based on a characteristic of the first media asset (e.g., specific templates for specific genres) and populate the template with textual content about the first media asset. For example, the media guidance application may insert the title and/or cast information of the first media asset into the default template.

It should be noted that the systems and/or methods described above may be applied to, or used in accordance with, other systems, methods and/or apparatuses.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
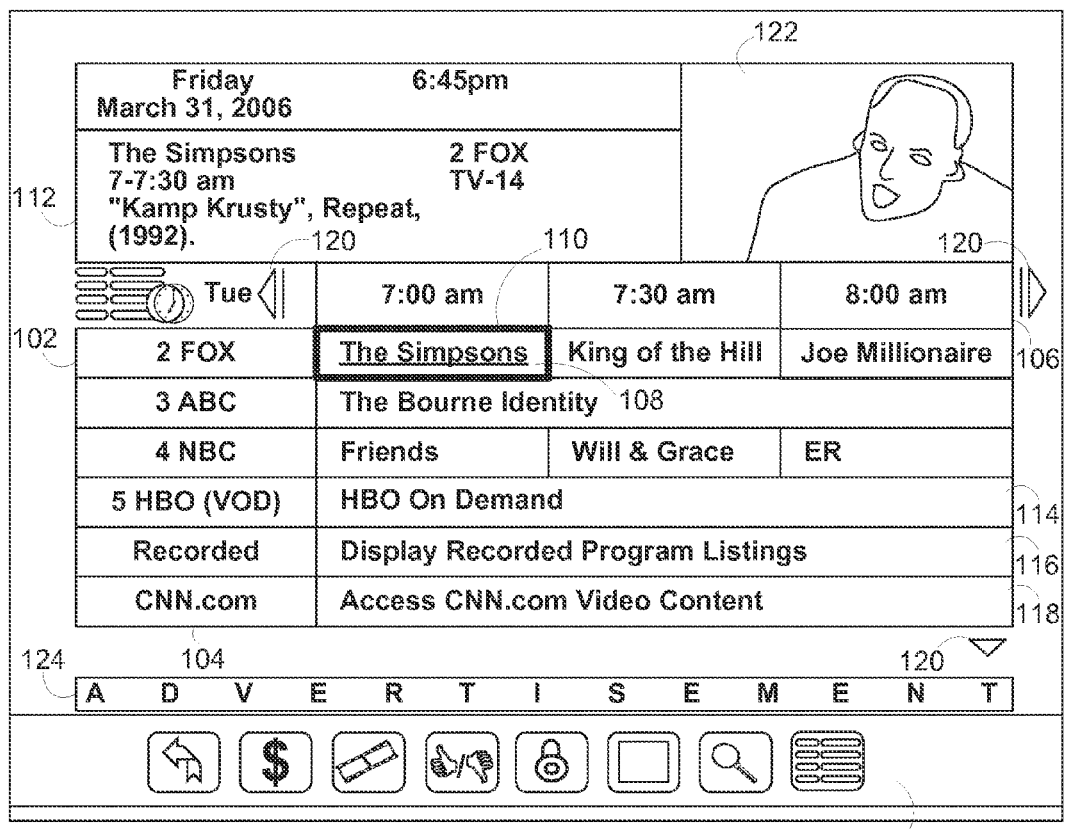
FIG. 1 shows an illustrative example of a display screen generated by a media guidance application that includes a plurality of media identifiers in accordance with some embodiments of the disclosure.

Methods and systems are described herein for providing objects describing media content. For example, in response to detecting that a particular media listing is not associated with a graphic and/or text content (e.g., box art) describing the particular media listing, a media guidance application may generate a custom graphic and/or text content (e.g., custom box art) for the media listing. Therefore, if the media guidance application generates for display a listing of media assets that each include graphic and/or text content associated with a respective media asset, the media guidance application may generate for display the custom graphic and/or text content for display with the particular media listing.

As used herein, a "media guidance application," "interactive media guidance application," or "guidance application" refers to an application that allows users, through an interface, to efficiently navigate content selections and/or easily identify content that they may desire. Media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content.

As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

As referred to herein, a "media identifier" refers to any indicator that allows a user to identify content. For example, a media identifier may include a media listing or program description. In some embodiments, the media identifier may include one or more portions, including, but not limited to, to one or more objects. As used herein, an "object" is any human readable indicia of the content of a media asset. For example, an object may include box art that populates a cell of a mosaic display that is associated with a particular media asset, a thumbnail representing a media asset, a screenshot or frame from the media asset, a trailer or highlight clip for a media asset, and/or any other preview of a media asset. In some embodiments, an object may include graphic and/or textual content. For example, an object may include a title of a media asset as well as cast and crew information. In some embodiments, objects may include interactive graphics, videos and/or animations. Alternatively or additionally, an object may include audio announcements and/or tones. In some embodiments, a media identifier may be associated with a particular area (e.g., a cell in mosaic listing). In such cases, the object may occupy the entire area or a portion of the area associated with media identifier.

The media guidance application may detect various characteristics about a media asset and use those particular characteristics to generate for display custom image or text content for the media listing. For example, the media guidance application may determine whether or not the media asset in need of custom graphic and/or text content is related to another media asset, is part of a particular genre, is associated with particular user preferences, etc. In response to determining the characteristics of a media asset in need of custom graphic and/or text content, the media guidance application may base the custom graphic and/or text content on these characteristics.

As used herein, a "characteristic" or a media asset or object refers to any attribute about the media asset or object that may be used to identify or distinguish one media asset or object from another media asset or object, respectively. In some embodiments, one or more characteristics about a first media assets and/or any content in a particular object may be determined by retrieving information about the media asset and/or the object from a database. For example, the media guidance application may access a database that lists various characteristics of a media asset such at the title, genre, any serial relationships, any available objects that describe the media asset, cast and crew information, critical reviews, social media comments, etc. concerning the media asset. The database may also list characteristics about an object such as the meaning and/or appearance of textual content, the font, color palette, graphics and/or animations present within the object, etc.

For example, in some embodiments, the media guidance application may cross-reference a database to determine whether or not a particular object has characteristics that would make the object suitable for use with another media asset. Moreover, the database may indicate the location and meaning of any text (e.g., in order for the media guidance application to determine whether or not to modify the text).

The media guidance application may also analyze the data for one or more media assets and/or objects to identify trends, industry staples, or other indicia of media content that frequently appear in objects associated with a particular type of media asset in order to customize objects. For example, if the media guidance application determines that most horror films use white text on a black background, the media guidance application may customize a retrieved object to have white text on a black background if the media guidance application determines the media asset associated with the object is in the horror genre.

In another example, the media guidance application may identify characteristics of a media asset and/or object based on object recognition modules incorporated and/or accessible to control circuitry upon which the media guidance application is implemented. For example, the media guidance application may include an object recognition module. The object recognition module may use edge detection, pattern recognition, including, but not limited to, self-learning systems (e.g., neural networks), optical character recognition, on-line character recognition (including, but not limited to, dynamic character recognition, real-time character recognition, intelligent character recognition), and/or any other suitable technique or method to determine the characteristics of media assets and/or objects. The media guidance application may apply these techniques to an object (e.g., either displayed on stored in a database to identify characteristics of the object.

If a media asset is a video, the media guidance application may analyze the media asset frame by frame. For each frame of the video, the media guidance application may use an object recognition module to determine the characteristics associated with each frame (or the media assets as a whole).

In some embodiments, the content-recognition module or algorithm may also include audio analysis and speech recognition techniques, including, but not limited to, Hidden Markov Models, dynamic time warping, and/or neural networks (as described above) to process audio data and/or translate spoken words into text. The content-recognition module may also use any other suitable techniques for processing audio and/or visual data.

In addition, the media guidance application may use multiple types of optical character recognition and/or fuzzy logic, for example, when comparing multiple data fields (e.g., as contained in databases described below). For example, after the content-recognition module or algorithm translates video and/or audio recordings into text, the media guidance application (e.g., via control circuitry 304) may cross-reference the translated text with a database (e.g., located at storage 308 or media guidance data source 418 (FIG. 4)) to determine a characteristic based on the translated text.

For example, the media guidance application may arrange the text into data fields and cross-reference the data fields with other data fields (e.g., in a lookup table database). The system may determine two fields and/or values to be identical even though the substance of the data field or value (e.g., two different spellings) is not identical. In some embodiments, the system may analyze particular data fields of a data structure or media asset frame for particular values or text. The data fields could be associated with characteristics, other data, and/or any other information required for the function of the embodiments described herein. Furthermore, the data fields could contain values (e.g., the data fields could be expressed in binary or any other suitable code or programming language).

In some embodiments, control circuitry may include an Internet access component. For example, the Internet access component may, additionally or alternatively, determine a characteristic based on information on the Internet (e.g., social media updates posted by users).

In some embodiments, the media guidance application may receive information from a particular source (e.g., a website, a profile associated with a user, a content provider, a social media network, etc.) for use in determining a characteristic. For example, the media guidance application may retrieve a list of friends (e.g., a social network buddy list), contacts (e.g., retrieved from a phone/text message/e-mail account associated with the user), and/or other listings featuring other entities with known associations to the user and obtain information used to determine a characteristic.

For example, the media guidance application may allow social network contacts of the user to vote whether or not a particular object should be associated with another media asset. For example, in response to determining that an object for a media asset is unavailable, the media guidance application may query social network contacts of the user for recommendation for an object. For example, the media guidance application may query the social network contacts for media assets that are related to the media asset for which the object is unavailable. Alternatively or additionally, the media guidance application may query social network contacts for other objects (e.g., clip art, image files, etc.) that should be used as the object. For example, the media guidance application may receive suggestions from social network contacts as to what object should be associated with a particular media asset or what criteria should be used to associate different objects with different media assets.

Alternatively or additionally, the media guidance application may query the social network contacts for user ratings that may be used to populate a cell for which an object is unavailable. For example, instead of inserting a substitute object, the media guidance application may generate a custom object that includes a rating of one or more social network users. In another example, the media guidance application may incorporate content received and/or posted on a social network into an object in a media identifier. For example, an object may be customized to include recommendations or reviews of a media asset provided by a member of a social network of a user. For example, an object or media identifier may indicate whether one or more members of a user's social network recommends a particular media asset.

As used herein, a "social network" refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by a social media provider may make content (e.g., status updates, microblog posts, images, graphic messages, etc.) associated with a first user accessible to a second user that is within the same social network as the first user.

For example, in response to determining that a media asset in need of custom graphic and/or text content is related to another media asset, the media guidance application may determine whether or not the other media asset has graphic and/or text content available. If so, the media guidance application may retrieve that graphic and/or text content for use with the media asset in need of custom graphic and/or text content. For example, the media guidance application may retrieve an image used in the media listing for the other media asset and replace the title with that of the media asset in need of custom graphic and/or text content.

In some embodiments, the media guidance application may receive a request for a first media identifier, in which the first media identifier is associated with a first object describing a first media asset. For example, the media guidance application may receive a request (e.g., a search query for media assets meeting user criteria) to generate for display a mosaic listing of available media assets (e.g., meeting the user criteria). For example, the first media identifier may include an area (e.g., a mosaic cell) in which the first object may be included.

The media guidance application may determine that the first object is not available in a database. For example, a first object may not be included in a database featuring a plurality of objects for a plurality of media identifiers and/or a user may not have access rights to the requested object. For example, in response to the request, the media guidance application may query a database listing available objects describing various media assets for an object describing the first media asset.

In some embodiments, the media guidance application may determine whether or not a media asset is related to another media asset. As used herein, a media asset is related to another media asset when the media assets share one or more characteristics. For example, media assets may be related if the media assets have a common genre, actor, producer, subject matter, etc. In some embodiments, the media guidance application may determine whether or not the first media asset is part of a series of media assets in response to determining that the first object is not available in the database. As used herein, "a series of media assets" refers to any set of media asset that has a relationship to one another such that an object that describes another media asset of the series of media assets would be likely be appropriate for another media asset of the series of media assets. For example, a series of media assets may include various episodes of a television program. A series of media assets may include a movie and the sequel to the movie. A series of media assets may refer to a group of media assets from a common source, common producer, common cast and crew, etc. For example, the box art for one movie featuring the actor Tom Cruise may be appropriate for box art for another media asset featuring Tom Cruise (as the box art includes a picture of Tom Cruise).

In some embodiments, the media guidance application may determine whether or not the first media asset is associated with (e.g., is part of the same program series as) other media assets in order to determine if objects associated with those other media assets may be associated with the first media asset. For example, the media guidance application may determine whether or not the first media asset is an episode of the series of media assets.

In response to determining that the first media asset is part of the series of media assets, the media guidance application may determine whether or not the database includes a second object, in which the second object is associated with the series of media assets. For example, the media guidance application may determine whether or not an object associated with a series of which the first media asset is included or an object associated with another media asset included in the series (e.g., another episode of the same series as the first media asset) is available.

In response to determining that the database includes the second object, the media guidance application may associate the second object with the first media identifier. In some embodiments, the media guidance application may store the relationship for the two media assets such that anytime a request is received for a media identifier associated with the first media asset the object of the media identifier associated with the second media asset is produced. For example, in response to determining that there is an available object associated with a series of which the first media asset is included or another media asset included in the series, the media guidance application may retrieve that object for use in the first media identifier.

The media guidance application may then generate for display the first media identifier with the second object. For example, after retrieving an object associated with a media asset that is related to the first media asset, the media guidance application may use that object in a media identifier for the first media asset.

In some embodiments, the media guidance application may customize the second object for use with the first media identifier. For example, the media guidance application may identify textual content in the second object (e.g., a title) and modify the textual content (e.g., replace the title of the second media asset in the second object with the title of the first media asset) based on a characteristic (e.g., the title of the first media asset) of the first media asset.

In some embodiments, the media guidance application may retrieve a default object in response to determining that the first media asset is not part of the series of media assets. For example, if the media guidance application fails to find another media asset that is associated with the first media asset, the media guidance application may retrieve a default object. In some embodiments, the media guidance application may store several default objects and select one of the default objects based on any characteristic (e.g., a genre, user preference, cast information, etc.) of the first media asset. Additionally or alternatively, the media guidance application may select a template (e.g., featuring particular fonts, type size, color palettes, etc.) for the default object based on a characteristic of the first media asset (e.g., specific templates for specific genres) and populate the template with textual content about the first media asset. For example, the media guidance application may insert the title and/or cast information of the first media asset into the default template.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
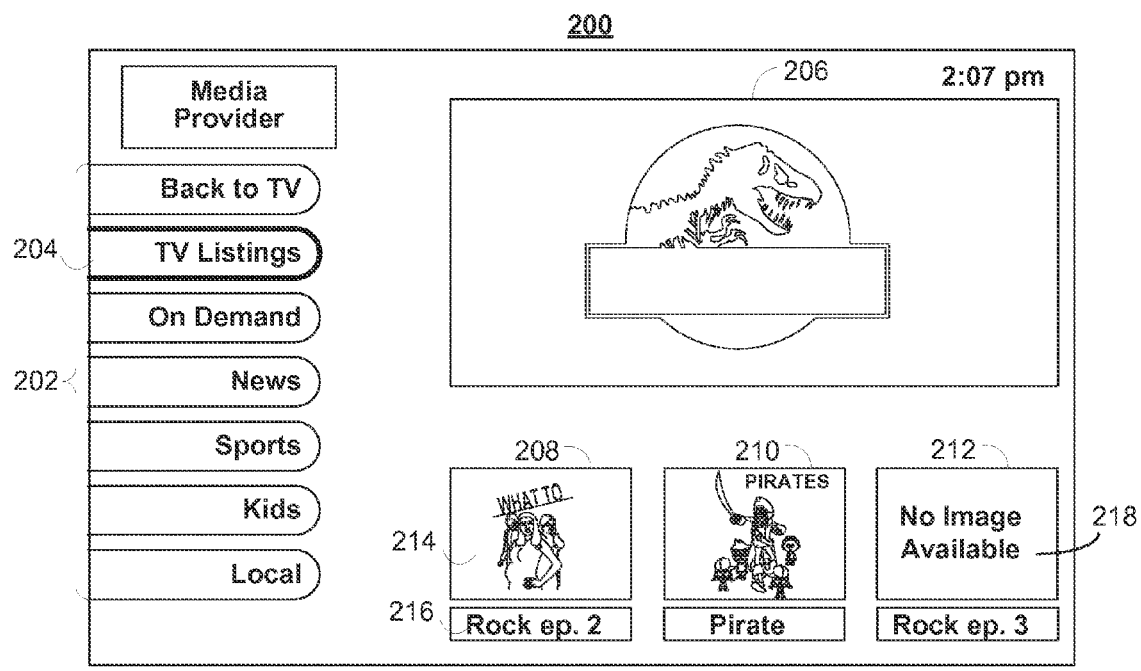
FIG. 2 shows another illustrative example of a display screen generated by a media guidance application that includes a plurality of media identifiers in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing media asset 206 and media identifiers 208, 210, and 212. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, media identifier 208 may include more than one portion, including object 214 and text portion 216. Object 214 and/or text portion 216 may be selectable to view content in full-screen or to view information related to the content displayed in object 214 (e.g., to view listings for the channel that the video is displayed on).

In display 200, media identifier 212 includes an area for an object describing the media asset associated with media identifier 212. However, as shown in display 200, an object describing the media asset associated with media identifier 212 is not available; thus a default object, object 218 is generated for display. In some embodiments, the media guidance application may generate for display a custom object. For example, the media guidance application may detect that that media asset associated with media identifier 208 is related to the media asset associated with media identifier 212 (e.g., both media assets are part of the same series of media content). In response, the media guidance application may generate a custom object for use with media identifier 212 based on object 214.

Media asset 206 in display 200 is larger than media identifiers 208, 210, and 212, but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
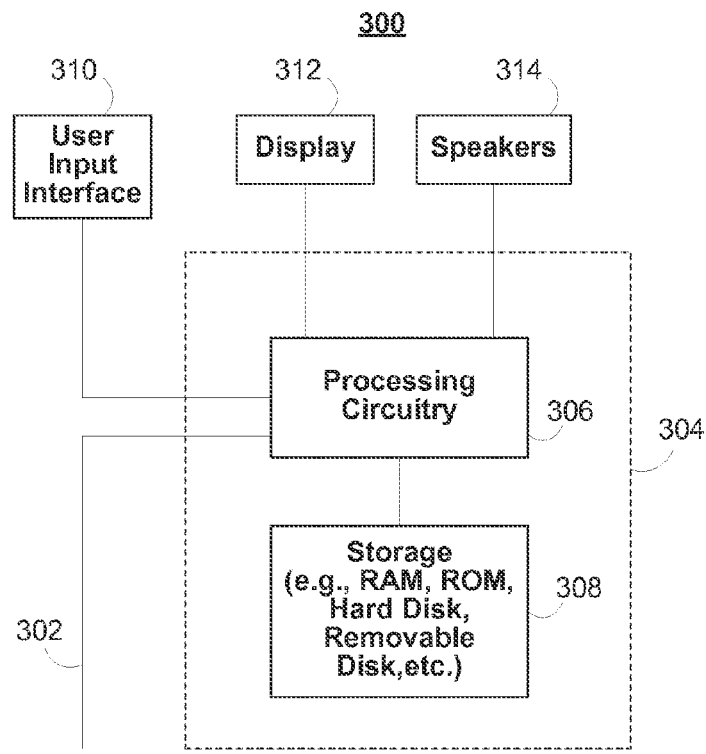
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions for the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
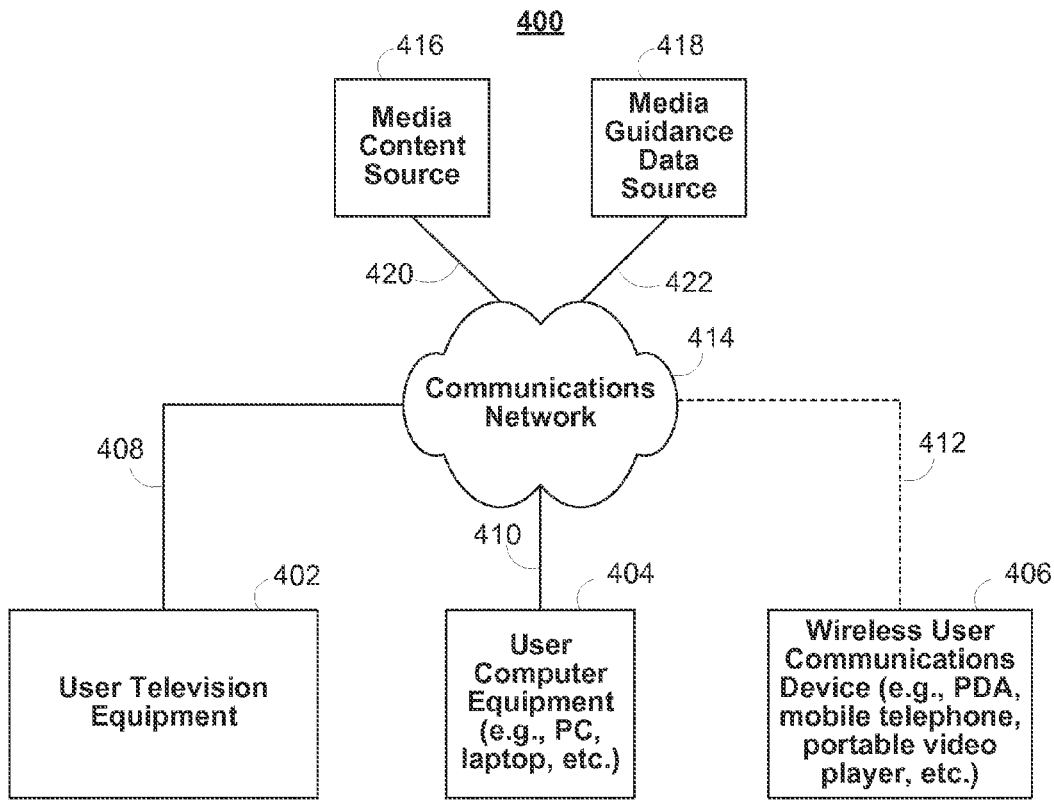
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
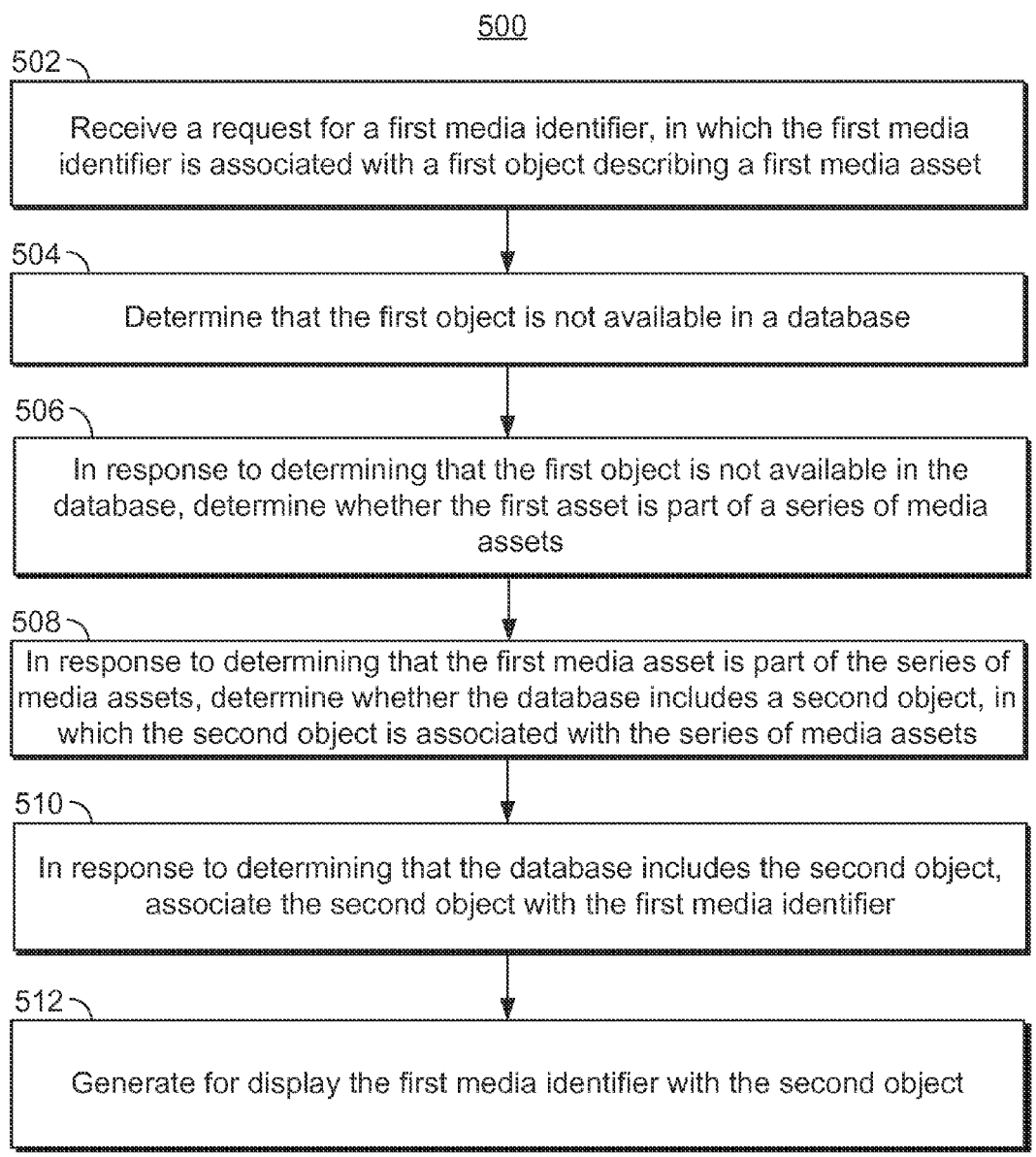
FIG. 5 is a flowchart of illustrative steps for generating a custom object for inclusion in a media identifier in accordance with some embodiments of the disclosure.

FIG. 5 is a flowchart of illustrative steps for generating a custom object for inclusion in a media identifier. It should be noted that process 500 or any step thereof could be performed on, or provided by, any of the devices shown in FIGS. 3-4. For example, process 500 may be executed by control circuitry 304 (FIG. 3) as instructed by a media guidance application implemented on a user device (e.g., user equipment devices 402, 404, and/or 406 (FIG. 4)) in order to generate a custom object for inclusion in a media identifier. In addition, one or more steps of process 500 may be incorporated into or combined with one or more steps of any other process or embodiment (e.g., as described in relation to FIG. 6)).

At step 502, the media guidance application receives (e.g., via user input interface 310 (FIG. 3)) a request for a first media identifier (e.g., identifier 212 (FIG. 2)), in which the first media identifier is associated with a first object (e.g., object 218 (FIG. 2)) describing a first media asset. For example, the media guidance application may receive a request (e.g., a search query for media assets meeting user criteria) to generate for display a mosaic listing (e.g., as shown in FIG. 2)) of available media assets (e.g., media assets corresponding to media identifiers 208, 210, and/or 212 (FIG. 2)). For example, the first media identifier may include an area (e.g., a mosaic cell corresponding to object 218) in which the first object may be included.

At step 504, the media guidance application determines (e.g., via control circuitry 304 (FIG. 3)) that the first object (e.g., object 218) is not available in a database (e.g., located at storage 308 (FIG. 3) and/or any location accessible via communications network 414 (FIG. 4)). For example, in response to the request, the media guidance application may query a database listing available objects describing various media assets for an object describing the first media asset. In some embodiments, the object may be graphic and/or text content such as box art (e.g., object 214 (FIG. 2)) that describes the first media asset.

At step 506, the media guidance application determines (e.g., via control circuitry 304 (FIG. 3)) whether or not the first media asset is part of a series of media assets (e.g., an episode in serial programming) in response to determining (e.g., via control circuitry 304 (FIG. 3)) that the first object (e.g., object 218 (FIG. 2)) is not available in the database (e.g., located at storage 308 (FIG. 3)) and/or any location accessible via communications network 414 (FIG. 4)). For example, in response to determining that the first object is not available, the media guidance application may search (e.g., via control circuitry 304 (FIG. 3)) for a second object (e.g., object 214 (FIG. 2)) for presentation with the first media identifier (e.g., identifier 218 (FIG. 2)). In some embodiments, the media guidance application may determine whether or not the first media asset is associated with (e.g., is part of the same program series as) other media assets in order to determine if objects associated with those other media assets may be associated with the first media asset. For example, the media guidance application may determine whether or not the first media asset is an episode of the series of media assets.

At step 508, in response to determining (e.g., via control circuitry 304 (FIG. 3)) that the first media asset is part of the series of media assets, the media guidance application determines (e.g., via control circuitry 304 (FIG. 3)) whether or not the database (e.g., located at storage 308 (FIG. 3)) and/or any location accessible via communications network 414 (FIG. 4)) includes a second object, in which the second object is associated with the series of media assets. For example, the media guidance application may determine (e.g., via control circuitry 304 (FIG. 3)) whether or not an object (e.g., object 214 (FIG. 2)) associated with a series of which the first media asset is included or an object associated with another media asset included in the series (e.g., another episode of the same series as the first media asset) is available.

At step 510, in response to determining (e.g., via control circuitry 304 (FIG. 3)) that the database (e.g., located at storage 308 (FIG. 3) and/or any location accessible via communications network 414 (FIG. 4)) includes the second object, the media guidance application may associate the second object (e.g., object 214 (FIG. 2)) with the first media identifier (e.g., identifier 212 (FIG. 2)). For example, in response to determining that there is an available object (e.g., object 214 (FIG. 2)) associated with a series of which the first media asset is included or another media asset included in the series, the media guidance application may retrieve that object (e.g., object 214 (FIG. 2)) for use in the first media identifier (e.g., identifier 212 (FIG. 2)).

At step 512, the media guidance application generates for display (e.g., via control circuitry 304 (FIG. 3)) the first media identifier (e.g., identifier 212 (FIG. 2)) with the second object (e.g., object 214 (FIG. 2)). For example, after retrieving an object associated with a media asset (e.g., the media asset associated with identifier 208 (FIG. 2)) that is related to the first media asset (e.g., the media asset associated with identifier 212 (FIG. 2)), the media guidance application may use that object in a media identifier for the first media asset.

In some embodiments, the media guidance application may customize (e.g., via control circuitry 304 (FIG. 3)) the second object (e.g., object 214 (FIG. 2)) for use with the first media identifier (e.g., identifier 218 (FIG. 2)). For example, the media guidance application may identify (e.g., via control circuitry 304 (FIG. 3)) textual content in the second object (e.g., a title) and modify the textual content (e.g., replace the title of the second media asset in the second object with the title of the first media asset) based on a characteristic (e.g., the title of the first media asset) of the first media asset.

In some embodiments, the media guidance application may retrieve (e.g., from storage 308 (FIG. 3) and/or any location accessible via communications network 414 (FIG. 4)) a default object in response to determining that the first media asset is not part of the series of media assets. For example, if the media guidance application fails to find another media asset that is associated with the first media asset, the media guidance application may retrieve (e.g., via control circuitry 304 (FIG. 3)) a default object. In some embodiments, the media guidance application may store several default objects (e.g., in storage 308 (FIG. 3) and/or any location accessible via communications network 414 (FIG. 4)) and select one of the default objects based on a characteristic (e.g., a genre, user preference, cast information, etc.) of the first media asset. Additionally or alternatively, the media guidance application may select a template (e.g., featuring particular fonts, type size, color palettes, etc.) stored locally (e.g., at storage 308 (FIG. 3)) or remotely (e.g., at any location accessible via communications network 414 (FIG. 4)) for the default object based on a characteristic of the first media asset (e.g., specific templates for specific genres) and populate the template with textual content about the first media asset. For example, the media guidance application may insert the title and/or cast information of the first media asset into the default template.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 5.

Figure 6:
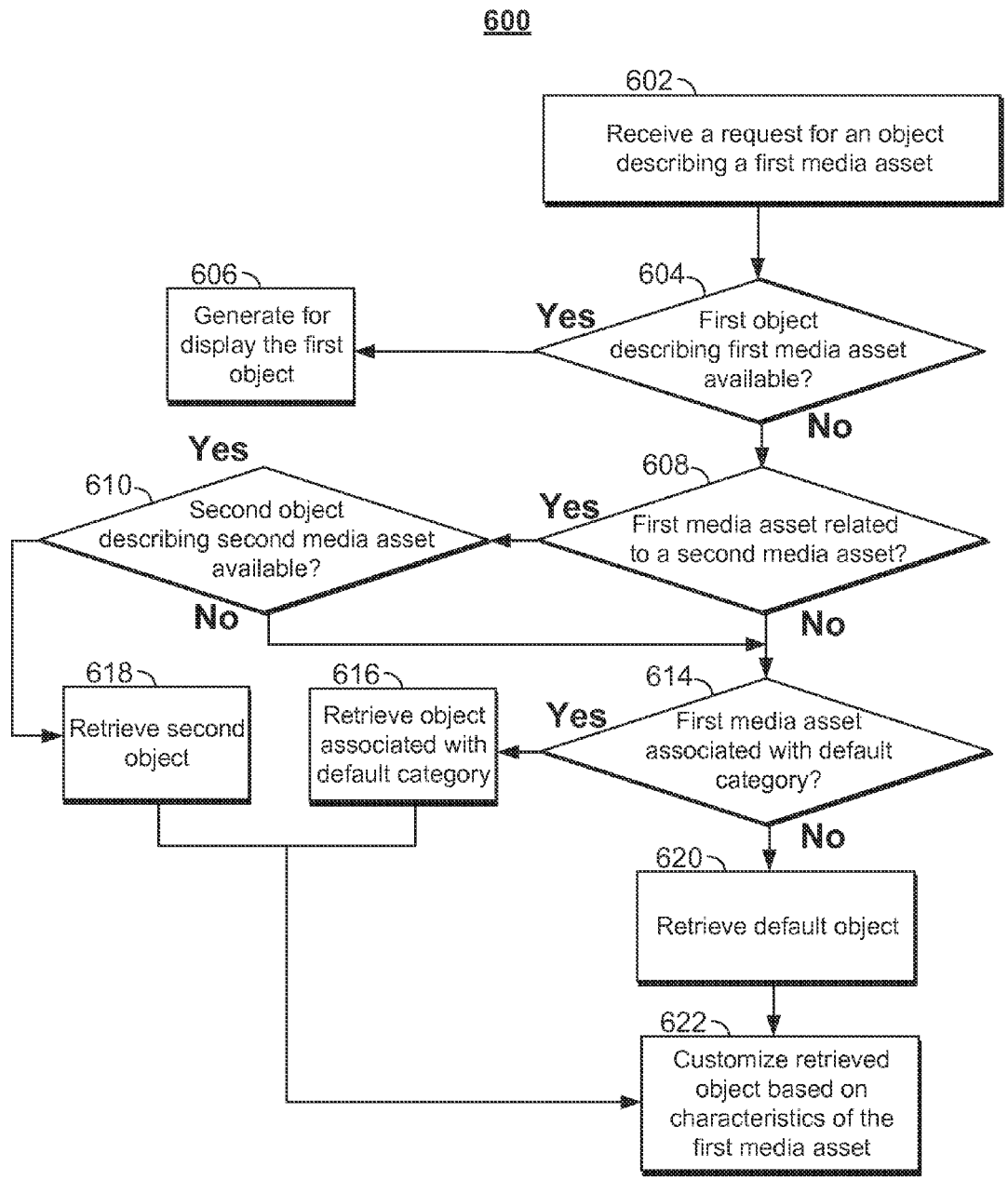
FIG. 6 is a flowchart of illustrative steps for customizing retrieved objects based on characteristics of the first media asset in accordance with some embodiments of the disclosure.

FIG. 6 is a flowchart of illustrative steps for customizing retrieved objects based on characteristics of a media asset. It should be noted that process 600 or any step thereof could be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to customize retrieved objects based on characteristics of a media asset. In addition, one or more steps of process 600 may be incorporated into or combined with one or more steps of any other process or embodiment (e.g., as described in relation to FIG. 5)).

At step 602, the media guidance application receives (e.g., via user input interface 310 (FIG. 3)) a request for an object (e.g., object 214 (FIG. 2)) describing a first media asset. For example, the media guidance application may have received a user input requesting all media identifiers associated with media assets meeting specific criteria. In response, the media guidance application may generate for display (e.g., on display 312 (FIG. 3)) a plurality of media identifiers (e.g., identifiers 208, 210, and/or 212 (FIG. 2)) associated with the media assets meeting the specific criteria.

At step 604, the media guidance application determines (e.g., via control circuitry 304 (FIG. 3)) whether or not a first object describing the first media asset is available. For example, the media guidance application may cross-reference a database (e.g., located at storage 308 (FIG. 3) and/or any location accessible via communications network 414 (FIG. 4)) listing media guidance data for each media asset. For example, the media guidance application may query the database for a first object describing the first media asset. If the media guidance application determines that a first object describing the first media asset is available, the media guidance application proceeds to step 606 and generates for display (e.g., on display 312 (FIG. 3) of user equipment 402, 404, and/or 406 (FIG. 4)) the first object. If the media guidance application determines that a first object describing the first media asset is not available, the media guidance application proceeds to step 608.

At step 608, the media guidance application determines (e.g., via control circuitry 304 (FIG. 3)) whether or not the first media asset is related to a second media asset. For example, as described in step 506 (FIG. 5)), the media guidance application may determine (e.g., via control circuitry 304 (FIG. 3)) whether or not the first media asset is part of a series of media assets (e.g., an episode in serial programming). For example, the media guidance application may cross-reference a database (e.g., located at storage 308 (FIG. 3)) and/or any location accessible via communications network 414 (FIG. 4)) listing media guidance data to determine (e.g., via control circuitry 304 (FIG. 3)) whether or not any of the media guidance data indicate that that first media asset is related to (e.g., is part of a series including, is a sequel to, is an alternative version of) a second media asset. If the media guidance application determines that the first media asset is related to the second media asset, the media guidance application proceeds to step 610.

At step 610, the media guidance application determines (e.g., via control circuitry 304 (FIG. 3)) whether or not (e.g., via control circuitry 304 (FIG. 3)) whether or not a second object describing the second media asset is available. For example, the media guidance application may cross-reference a database (e.g., located at storage 308 (FIG. 3) and/or any location accessible via communications network 414 (FIG. 4)) listing media guidance data for each media asset. For example, the media guidance application may query the database for a second object describing the second media asset. If the media guidance application determines (e.g., via control circuitry 304 (FIG. 3)) that a second object describing the second media asset is available, the media guidance application proceeds to step 618 and retrieves the second object (e.g., from storage 308 (FIG. 3) and/or any other location accessible via communications network 414 (FIG. 4)) before proceeding to step 622. If the media guidance application determines that a second object describing the second media asset is not available, the media guidance application proceeds to step 614. It should be noted that in some embodiments, the media guidance application may perform multiple iterations in which the media guidance application determines whether any media asset related to the first media asset has an available object describing that media asset.

If the media guidance application determines, at step 608, that the first media asset is not related to a second media asset, the media guidance application proceeds to step 614. At step 614, the media guidance application determines whether or not the first media asset is associated with default category. For example, in response to determining (e.g., via control circuitry 304 (FIG. 3)) that the first media asset is not associated with another media asset, the media guidance application may determine (e.g., via control circuitry 304 (FIG. 3))) whether the first media asset is associated with a category that indicates a particular default object or default template that should be used. For example, the media guidance application may select the particular default object or default template from a plurality of default objects or templates that are stored (e.g., at storage 308 (FIG. 3) any/or any location accessible via communications network 414 (FIG. 4)).

For example, the media guidance application may use a particular default object or a particular default template for different types of media assets and/or different categories of media asset. For example, the media guidance application may select (e.g., via control circuitry 304 (FIG. 3)) a first default object or template if the media asset corresponds to the horror genre and a second default object or template if the media asset corresponds to the comedy genre.

For example, the media guidance application may cross-reference a database (e.g., located at storage 308 (FIG. 3) and/or any location accessible via communications network 414 (FIG. 4)) listing media guidance data for each media asset. For example, the media guidance application may query the database for characteristics about the first media asset that indicate a particular default category, if any.

If the media guidance application determines that the first media asset is associated with a default category, the media guidance application proceeds to step 616 and retrieves (e.g., from storage 308 (FIG. 3) and/or any location accessible via communications network 414 (FIG. 4)) an object associated with the default category before proceeding to step 622. If the media guidance application determines that the first media asset is not associated with a default category, the media guidance application proceeds to step 620 and retrieves (e.g., from storage 308 (FIG. 3) and/or any location accessible via communications network 414 (FIG. 4)) a default object. For example, the default object may be a generic object that indicates to the user that no other object is available.

At step 622, the media guidance application customizes (e.g., via control circuitry 304 (FIG. 3)) the retrieved object based on characteristics of the first media asset. For example, the media guidance application may populate (e.g., via control circuitry 304 (FIG. 3)) fields on the object that are associated with the tile with the title of the first media asset. Likewise, the media guidance application may add/remove textual content from the object, may alter the color palette of the media asset, or otherwise graphically accentuate a part of the object based on a characteristic of the first media asset.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for providing objects describing media content, the method comprising:
   receiving, using control circuitry, a request for a first media identifier, wherein the first media identifier is associated with a first box art describing a first media asset;
   determining, using the control circuitry, that the first box art is not available in a database storing box art for media identifiers;
   in response to determining that the first box art is not available in the database, determining, using the control circuitry, whether the first media asset is part of a series of media assets;

in response to determining that the first media asset is part of the series of media assets, determining, using the control circuitry, whether the database includes a second box art, wherein the second box art is associated with the series of media assets;

in response to determining that the database includes the second box art, associating, using the control circuitry, the second box art with the first media identifier; and generating for display, on a display device, the first media identifier with the second box art.

2. The method of claim 1, further comprising determining whether the first media asset is an episode of the series of media assets.

3. The method of claim 1, wherein the second box art is selected based on votes received from a social network.

4. The method of claim 1, further comprising:
identifying textual content in the second box art; and
modifying the textual content based on a characteristic of the first media asset.

5. The method of claim 1, wherein the first media identifier comprises a cell in a mosaic display.

6. The method of claim 1, further comprising, in response to determining that the first media asset is not part of the series of media assets, retrieving a default box art.

7. The method of claim 6, wherein the default box art is selected based on a characteristic of the first media asset.

8. The method of claim 6, wherein a template for the default box art is selected based on a characteristic of the first media asset.

9. The method of claim 6, wherein the default box art is populated with textual content about the first media asset.

10. A system for providing objects describing media content, the system comprising:
storage circuitry configured to store a database of box art: and control circuitry configured to:
receive a request for a first media identifier, wherein the first media identifier is associated with a first box art describing a first media asset;
determine that the first box art is not available in the database;
in response to determining that the first box art is not available in the database, determine whether the first media asset is part of a series of media assets;
in response to determining that the first media asset is part of the series of media assets, determine whether the database includes a second box art, wherein the second box art is associated with the series of media assets;
in response to determining that the database includes the second box art, associate the second box art with the first media identifier; and
generate for display the first media identifier with the second box art.

11. The system of claim 10, wherein the control circuitry is further configured to determine whether the first media asset is an episode of the series of media assets.

12. The system of claim 10, wherein the second box art is selected based on votes received from a social network.

13. The system of claim 10, wherein the control circuitry is further configured to:
identify textual content in the second box art; and
modify the textual content based on a characteristic of the first media asset.

14. The system of claim 10, wherein the first media identifier comprises a cell in a mosaic display.

15. The system of claim 10, wherein the control circuitry is further configured to retrieve a default box art in response to determining that the first media asset is not part of the series of media assets.

16. The system of claim 15, wherein the default box art is selected based on a characteristic of the first media asset.

17. The system of claim 15, wherein a template for the default box art is selected based on a characteristic of the first media asset.

18. The system of claim 15, wherein the default box art is populated with textual content about the first media asset.

* * * * *